Dec. 14, 1926.  
A. HUSING  
1,610,949
INFUSER FOR COFFEE, TEA, OR OTHER EXTRACTION LIQUIDS
Filed April 24, 1925
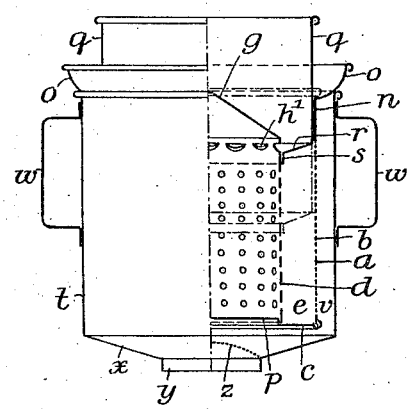
Witnesses
Inventor
Adolf Hüsing

Patented Dec. 14, 1926.

1,610,949

UNITED STATES PATENT OFFICE.

ADOLF HÜSING, OF GROSS FLOTTBEK, NEAR HAMBURG, GERMANY.

INFUSER FOR COFFEE, TEA, OR OTHER EXTRACTION LIQUIDS.

Application filed April 24, 1925, Serial No. 25,710, and in Germany April 30, 1924.

The present invention relates to an improved infuser for coffee, tea or other extraction liquids.

Special objects of the invention are to render more efficient, serviceable and durable in operation devices of the kind referred to.

With these ends in view the invention consists in the novel combination, arrangement and adaptation of parts, all as more fully hereinafter described, shown in the accompanying drawings and then specifically set out in the appended claims.

In the drawings is illustrated one way of carrying into practice this invention, the infuser being shown in a central vertical section.

The improved infuser, which acts as a filter, comprises essentially a receptacle $a$ of cylindrical shape having the same diameter throughout its entire length. The sieve-like or perforated shell $b$ of the receptacle $a$ extends from the lower edge to the top edge of the latter, the top edge being strengthened by a non-perforated rim $n$, which simultaneously serves for forming a funnel $o$. The shell $b$ is securely attached to the non-perforated bottom $c$. The bottom $c$ carries concentric with the shell $b$ a sieve-like or perforated tube $d$, which forms an annular chamber $e$ for the reception of the ground coffee, tea or other substance to be extracted. The tube $d$, which is open at the lower end, is supported on the bottom $c$ and is automatically centered by means of a projection $p$ rising from the bottom $c$ and tightly fitting the tube $d$ at its base.

The tube $d$ carries a conical hood $g$ integral therewith or securely attached thereto. Immediately below the hood $g$, passages $h^1$ are provided, which are directed towards the apex of the hood $g$ by stamping the metal in the manner shown.

The top closure of the infuser is formed by a cylindrical cup $q$ serving for pouring boiling water thereinto. The cup $q$ corresponds in external diameter to the internal diameter of the receptacle $a$. Its bottom $r$, which tapers towards the center, is centrally provided with a hole fitting on the tube $d$, the hole being bordered by a downwardly depending flange $s$.

The annular bottom $r$ completely covers the annular chamber $e$ formed between the receptacle $a$ and the tube $d$. In inserting the cup $q$ in the receptacle $a$, the annular bottom $r$ comes to bear against the contents of the chamber $e$, the cup being movable like a piston in the receptacle $a$.

The infuser may be supplemented by a pot-like vessel $t$ adapted to contain the infuser and to support same by means of the funnel $o$. The larger diameter of the vessel $t$ provides an annular space $v$ around the receptacle $a$.

The vessel $t$, fitted externally with one or two handles $w$, has a bottom $x$ tapering towards the center. A hole provided at the center is bordered by a downwardly depending flange $y$. Said hole is covered by a sieve-cover $z$ having a convex surface on top.

To employ the improved infuser, ground coffee or the like is to be filled into the annular chamber $e$ and after the latter has been closed by the annular bottom $r$ of the cup $q$, boiling water has to be poured into the latter, which by way of the passages $h^1$ below the hood $g$ reaches the interior of the tube $d$. Passing through the sieve-like or perforated shell of the tube $d$, the boiling water gains access to the ground coffee or the like in the annular chamber $e$ extracting same in the usual manner. The extract flows through the sieve-like or perforated shell $b$ of the receptacle $a$ into the receiver consisting of a pot, drinking cup or the like, so that the extract collects therein and is ready for consumption or other use.

The extractive matter contained in the annular chamber $e$, by reason of its enlargement in volume due to the saturation with the boiling water, exerts an expansive force, which acts against the bottom $r$ of the cup $q$ driving the latter upwardly and in this way automatically regulating the supply of water from the cup $q$ to the interior of the perforated tube $d$.

If a pot $t$ is employed in connection with the infuser, solid matter carried with the extract into the pot $t$ accumulates in the trench bordered by the conical bottom $x$ and the cover $z$. The sediment can be easily removed when cleaning the infuser by taking same to pieces. To thoroughly clean the infuser, the latter can be taken to pieces with facility. The aggregation of the parts, after cleaning them, is effected in the manner hereinbefore described. It requires no special skill or attention and can be effected within a few seconds.

I wish it to be distinctly understood, that I do not limit myself to the precise construction shown, variations in the arrangement and aggregation of the several parts being possible according to desire or requirement without departing from the scope and spirit of the invention.

What I do claim as my invention and desire to secure by Letters Patent is:—

1. An improved infuser for coffee, tea or other extractive matter comprising a vessel having a perforated shell, a non-perforated bottom closing the vessel at its lower end, a tubular member having a perforated shell loosely erected on the bottom of the aforesaid vessel and centered thereby so as to provide an annular chamber in the vessel for the reception of the extractive matter, a conical hood closing the tubular member on top, the tubular member being provided with upwardly directed openings in its circumferential wall below the conical hood, and a cover for the aforesaid vessel forming a receptacle for pouring water or the like thereinto, said cover having a central opening in its bottom tightly encircling the aforesaid tubular member below the upwardly directed openings, substantially as and for the purpose set forth.

2. An improved infuser for coffee, tea or other extractive matter comprising a vessel having a perforated shell, a non-perforated bottom closing the vessel at its lower end, a projection rising centrally from said bottom, a tubular member having a perforated shell loosely erected on the bottom of the aforesaid vessel and centered by the projection thereof so as to provide an annular chamber in the vessel for the reception of the extractive matter, a conical hood closing the tubular member on top, the tubular member being provided with upwardly directed openings in its circumferential wall below the conical hood, and a cover for the aforesaid vessel forming a receptacle for pouring water or the like thereinto, said cover having a central opening in its bottom tightly encircling the aforesaid tubular member below the upwardly directed openings, substantially as and for the purpose set forth.

3. An improved infuser for coffee, tea or other extractive matter comprising a vessel having a perforated shell, a flanged rim bordering said vessel at its open top end, a non-perforated bottom closing the vessel at its lower end, a tubular member having a perforated shell loosely erected on the bottom of the aforesaid vessel and centered thereby so as to provide an annular chamber in the vessel for the reception of the extractive matter, a conical hood closing the tubular member on top, the tubular member being provided with upwardly directed openings in its circumferential wall below the conical hood, a cover for the aforesaid vessel forming a receptacle for pouring water or the like thereinto, said cover having a central opening in its bottom tightly encircling the aforesaid tubular member below the upwardly directed openings, and a pot having a central opening in its bottom supporting the aforesaid vessel by means of the flanged rim of the latter, substantially as and for the purpose set forth.

4. An improved infuser for coffee, tea or other extractive matter comprising a vessel having a perforated shell, a flanged rim bordering said vessel at its open top end, a non-perforated bottom closing the vessel at its lower end, a tubular member having a perforated shell loosely erected on the bottom of the aforesaid vessel and centered thereby so as to provide an annular chamber in the vessel for the reception of the extractive matter, a conical hood closing the tubular member on top, the tubular member being provided with upwardly directed openings in its circumferential wall below the conical hood, a cover for the aforesaid vessel forming a receptacle for pouring water or the like thereinto, said cover having a central opening in its bottom tightly encircling the aforesaid tubular member below the upwardly directed openings, and a pot having a central opening in its bottom supporting the aforesaid vessel by means of the flanged rim of the latter, the bottom opening of the pot being covered by a sieve-cover concaved towards the top, substantially as and for the purpose set forth.

5. An improved infuser for coffee, tea or other extractive matter comprising a vessel having a perforated shell, a non-perforated bottom closing the vessel at its lower end, a tubular member having a perforated shell loosely erected on the bottom of the aforesaid vessel and centered thereby so as to provide an annular chamber in the vessel for the reception of the extractive matter, a conical hood closing the tubular member on top, the tubular member being provided with upwardly directed openings in its circumferential wall below the conical surface, and a cover for the aforesaid vessel forming a receptacle for pouring water or the like thereinto, said cover being cup-shaped and adapted to move like a piston in the aforesaid vessel, the bottom of this cup-shaped cover having a central opening bordered by a flange which tightly encircles the aforesaid tubular member below the upwardly directed openings, substantially as and for the purpose set forth.

In witness whereof I have hereunto signed my name this 7th day of April, 1925.

ADOLF HÜSING.